April 22, 1952 A. J. AUKERS ET AL 2,593,648
GASKET CLIP
Filed Sept. 19, 1947
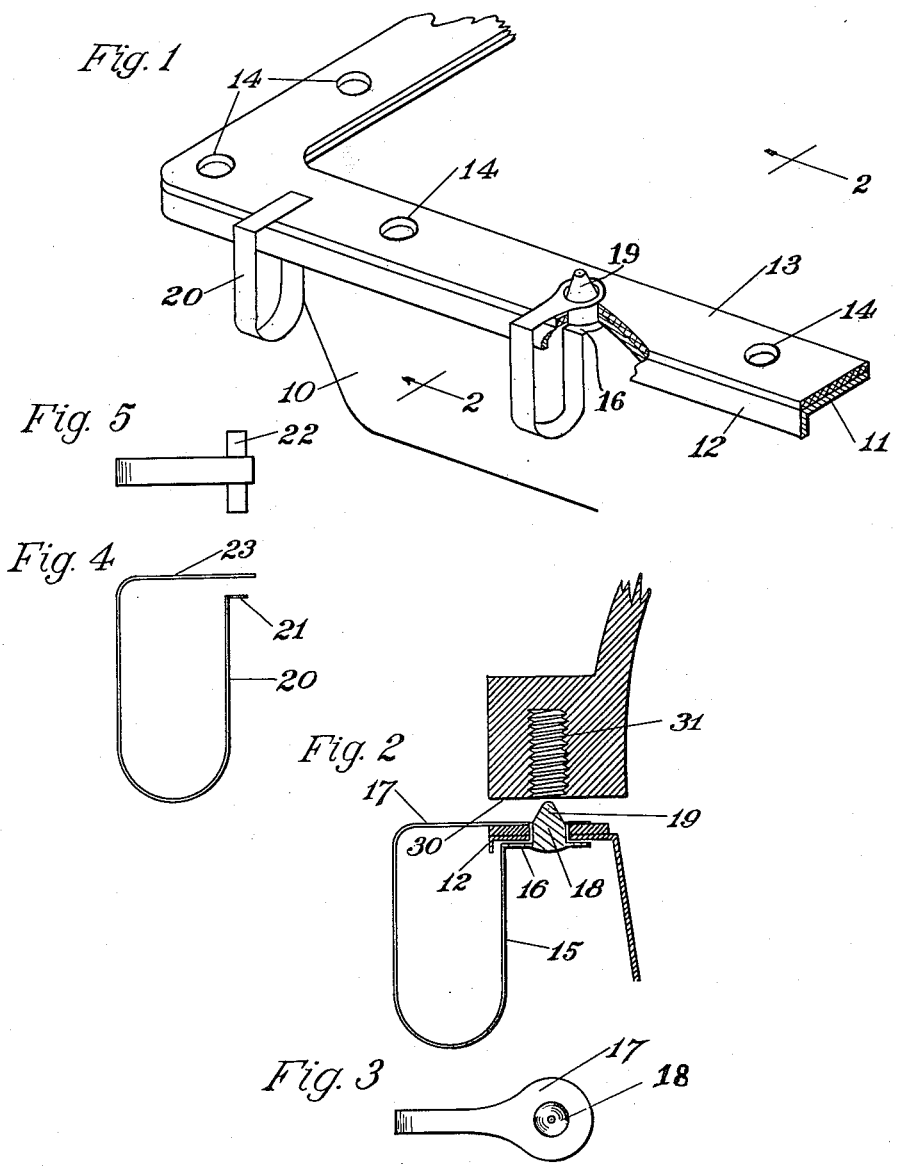
Albert J. Aukers
Raymond A Church INVENTORS
BY George J. Haight
ATTORNEY Patented Apr. 22, 1952

2,593,648

UNITED STATES PATENT OFFICE 2,593,648

GASKET CLIP

Albert J. Aukers and Raymond A. Church, Chicago, Ill., assignors to Victor Manufacturing & Gasket Co., Chicago, Ill., a corporation of Illinois Application September 19, 1947, Serial No. 775,074

2 Claims. (Cl. 29—285)

This invention relates to clips for holding gaskets on mounting members and has for its principal object a new and improved clip of this kind.

It is a main object of the invention to provide a clip for holding a gasket on the pan of an internal combustion engine during installation of the pan on the engine.

Another object of the invention is to provide a gasket clip which definitely registers the gasket with the pan.

Another object of the invention is to provide a gasket clip which registers the gasket with the pan and aids in registering the pan with the crankcase of the engine.

Still another object of the invention is to provide a gasket clip which can be manufactured at low cost without sacrificing quality and which can be quickly and conveniently attached to and removed from the gasket and pan.

Further objects of the invention not specifically mentioned here will be apparent from the detailed description and claims which follow, reference being had to the accompanying drawings in which a preferred embodiment of the invention is shown by way of example, and in which Fig. 1 is a fragmentary perspective view showing the application of the clip to the gasket and pan;

Fig. 2 is a cross sectional view taken substantially along the line 2—2 of Fig. 1, looking in the direction of the arrows and showing also a fragmentary section of the engine block;

Fig. 3 is a plan view of the clip shown in Figs. 1 and 2;

Fig. 4 is an elevational view of a modified form of clip; and

Fig. 5 is a plan view of the clip shown in Fig. 4.

Gaskets composed of a soft, compressible material, such as cork or a fibrous composition, are frequently used to seal the joint between two parts of a machine. Thus, for example, in an internal combustion engine a gasket is used to seal the junction line of the crankcase pan and crankcase of the engine.

In the past it has been the practice of mechanics when installing a pan on an engine, to cement the gasket to the pan usually with a quick-drying cement, such as shellac. The pan is then registered with the motor block and stud bolts projected through the perforations in the pan and gasket and into the block to secure the pan thereto. In other instances, gaskets have been secured to the pan by tying them thereon with string or thread; and also, in certain cases, clips have been used for this purpose.

In none of these prior art practices does the means for securing the gasket to the pan aid in properly registering the pan with the motor block, and, as will be readily appreciated, since this work is done underneath the car, the mechanic frequently encountered difficulty in registering the pan with the block and oftentimes the gasket is damaged, if not ruined, during this operation.

The present invention provides a clip which contains relatively large surfaces adapted to engage the gasket and flange on the pan, and which also contains lugs, preferably cylindrical, which project through the perforations in the flange and gasket to register the gasket properly with the pan. These lugs also have conical points projecting beyond the upper portion of the gasket and adapted to enter the threaded openings in the motor block, thereby to accurately register the gasket and pan with the block. In certain locations on the motor, such as for example corners, the use of a modified type of clip is advantageous, this clip being adapted to engage the gasket and flange at points between the perforations to securely hold the gasket thereto.

With the use of the clip of the present invention, cementing the gasket to the flange is eliminated, and the time required for this operation and the time that must be allowed for setting of the cement is eliminated.

Referring now to the drawings in more detail, wherein a typical gasket and crankcase pan are illustrated by way of example, it will be seen that the pan 10 has an outwardly projecting flange 11 that is provided with a bead or lip 12 at its outermost edge. A gasket 13, composed of cork or other compressible material, is shaped to register accurately with the flange on the pan and contains perforations 14 through which are projected the studs that are employed to secure the pan to a motor block. As will be seen in Figs. 1, 2, and 3, the clip of the present invention comprises a main, generally U-shaped portion 15, the arms of which have extensions 16 and 17 disposed at substantially right angles thereto and brought into juxtaposition each with the other.

The extensions 16 and 17 are conveniently circular in configuration, and a post or lug 18 is fixed to the extension 16 concentrically therewith. Extension 17 contains a perforation through which the conical point 19 of the lug 18 projects. The clip 15 and extensions 16 and 17 are composed of a spring material, preferably steel, of about 57 to 58 C-scale Rockwell hardness.

The arms are tensioned to urge the extensions 16 and 17 together, thereby enabling them to exert a pressure on the gasket and flange to clamp the two together. In securing the gasket to the flange, clips, such as 15, will be registered with several of the perforations in the gasket, and in certain instances it may be advantageous to use a clip in every other perforation therein.

In addition to the clip 15, a clip 20 of the type shown in Figs. 1, 4, and 5 may oftentimes be used. This clip, likewise of generally U-shape configuration and composed of spring material of the same hardness, has extensions on the arms of the U disposed substantially at right angles to the arms and in juxtaposition to each other. Extension 21, which is the lowermost extension, contains a foot 22 which is disposed at right angles to the plane of the U and adapted to engage the under side of the flange of the pan. The upper extension 23 is plain. The arms of the clip are tensioned to urge extensions 21 and 23 together to provide clamping pressure on the gasket.

With the clips registered with the flange and gasket, they will extend downwardly along the outer surface of the pan, and the enlarged area in engagement with the flange will keep the clip at substantially right angles to the plane of the under surface of the flange. It will be noted that the clip is shaped and proportioned so as to readily fit inside of the bead 12 and between it and the perforations in the flange.

With the gasket so secured to the flange of the pan, the mechanic elevates the pan into registration with the motor block, the conical portions 19 of the lugs 18 entering the bolt holes therein and serving to quickly bring the pan into proper registration with the block. The conical points 19 engage the lowermost surface 30 of the motor block prior to registration with the bolt holes 31 therein and serve to space the gasket away from the block during lateral movement of the pan with respect thereto. This eliminates the possibility of tearing the gasket as by dragging it over the surface 30.

As soon as one or two stud bolts have been inserted to secure the pan to the block, the clip is removed by bending the innermost arm downwardly, thereby to withdraw lug 18 and extension 16 from registration with the gasket and flange; and after these elements have cleared, the clip is moved outwardly to withdraw the upper extension 17 from the space between the gasket and surface 30.

While the clip of the present invention is primarily designed to facilitate attaching a gasket and pan of an internal combustion engine, its use is not limited to this particular adaptation, and other uses of the clip are contemplated within the teachings of the invention. The specific design of clip illustrated is subject to modification within the teachings of the invention to adapt it to use with other machine elements.

It will be apparent that the clip of the present invention is possessed of many advantages. It securely binds the gasket to the machine element without the use of cement, and the time required to secure these parts together is minimized. Proper registration of the gasket with the machine part is readily secured through the use of the positioning lugs which serve also to space the gasket away from the element on which it is to be mounted during lateral movements required to register the two together. The registering lugs serve also to properly register the gasket and machine element with another machine element, minimizing or entirely eliminating gasket damage during this operation. The device can be cheaply made, without sacrificing quality, and used repeatedly with little or no maintenance cost.

Having thus complied with the statutes and shown and described a preferred embodiment of our invention, what we consider new and desire to have patented by Letters Patent is pointed out in the appended claims.

What is claimed is:

1. As an article of manufacture, a clip for holding a gasket on an oil pan during assembly of the pan and gasket on an engine and for aligning holes in the pan and gasket with holes in the engine, comprising: a spring of rectangular cross section formed in U shape; a generally circular extension on one arm of said spring disposed at right angles thereto and extending therefrom away from the other arm of the spring; a cylindrical boss on said circular extension extending therefrom in the direction away from the closed end of the spring; an extension on the other arm of said spring disposed at right angles thereto and extending across the open end of the spring; an enlarged portion on said latter extension overlying said generally circular extension and containing a perforation into which said cylindrical boss projects; and a conical point on said boss projecting beyond said enlarged portion.

2. As an article of manufacture, a clip for holding a gasket on an oil pan during assembly of the pan and gasket on an engine and for accurately aligning holes in the gasket pan and engine, comprising: a U-shaped body composed of spring material; an extension on one arm of said body disposed at right angles to the arm and extending therefrom away from the other arm; a cylindrical boss fixed on said extension and having a diameter enabling the boss to fit snugly in holes in the gasket and pan to accurately register the two members together; an extension on the other arm of said body, extending across the open end thereof into juxtaposition to said first extension; a head on said latter extension overlying said first extension and perforated to receive said cylindrical boss, said spring being tensioned to urge said head towards said first extension; and a conical tip on said boss extending beyond said head to register the holes in the gasket and pan with holes in the engine.

ALBERT J. AUKERS.
RAYMOND A. CHURCH.

REFERENCES CITED

The following references are of record in the file of this patent:

UNITED STATES PATENTS

| Number | Name | Date |
| --- | --- | --- |
| 126,901 | Phelps | May 21, 1872 |
| 385,498 | Brinton | July 3, 1888 |
| 618,557 | Brewington | Jan. 3, 1899 |
| 633,674 | Ward | Sept. 26, 1899 |
| 993,773 | Grabau | May 30, 1911 |
| 1,435,887 | Anderson | Nov. 14, 1922 |
| 1,618,194 | Herrman | Feb. 22, 1927 |
| 1,746,962 | Perry | Feb. 11, 1930 |
| 2,046,854 | Simpson | July 7, 1936 |
| 2,363,210 | Tinnerman | Nov. 21, 1944 |
| 2,390,750 | Tinnerman | Dec. 11, 1945 |
| 2,415,540 | Simmons | Feb. 11, 1947 |

FOREIGN PATENTS

| Number | Country | Date |
| --- | --- | --- |
| 209,236 | Germany | Nov. 12, 1907 |